Aug. 5, 1924.
J. J. KUNZER
1,503,836
DEEP DRILLING MACHINE
Filed April 7, 1919   2 Sheets-Sheet 1
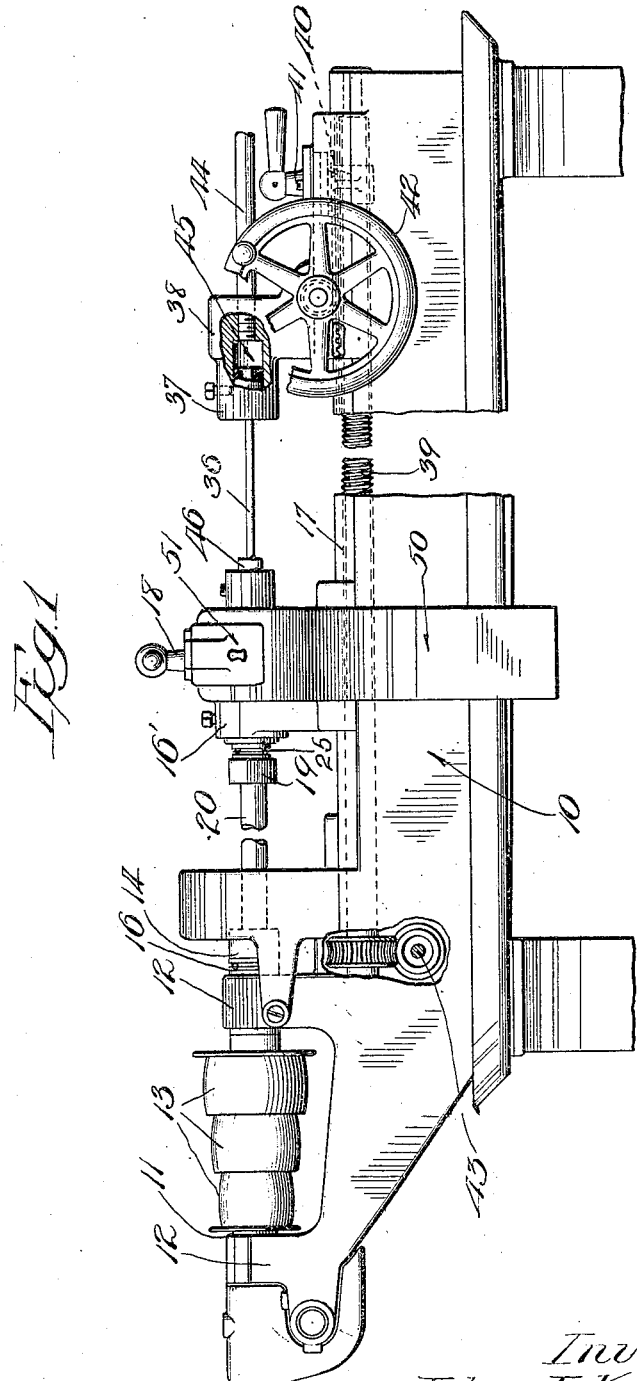
Inventor:
John J. Kunzer
William H. Haep
Atty Aug. 5, 1924.
J. J. KUNZER
1,503,836
DEEP DRILLING MACHINE
Filed April 7, 1919  2 Sheets-Sheet 2
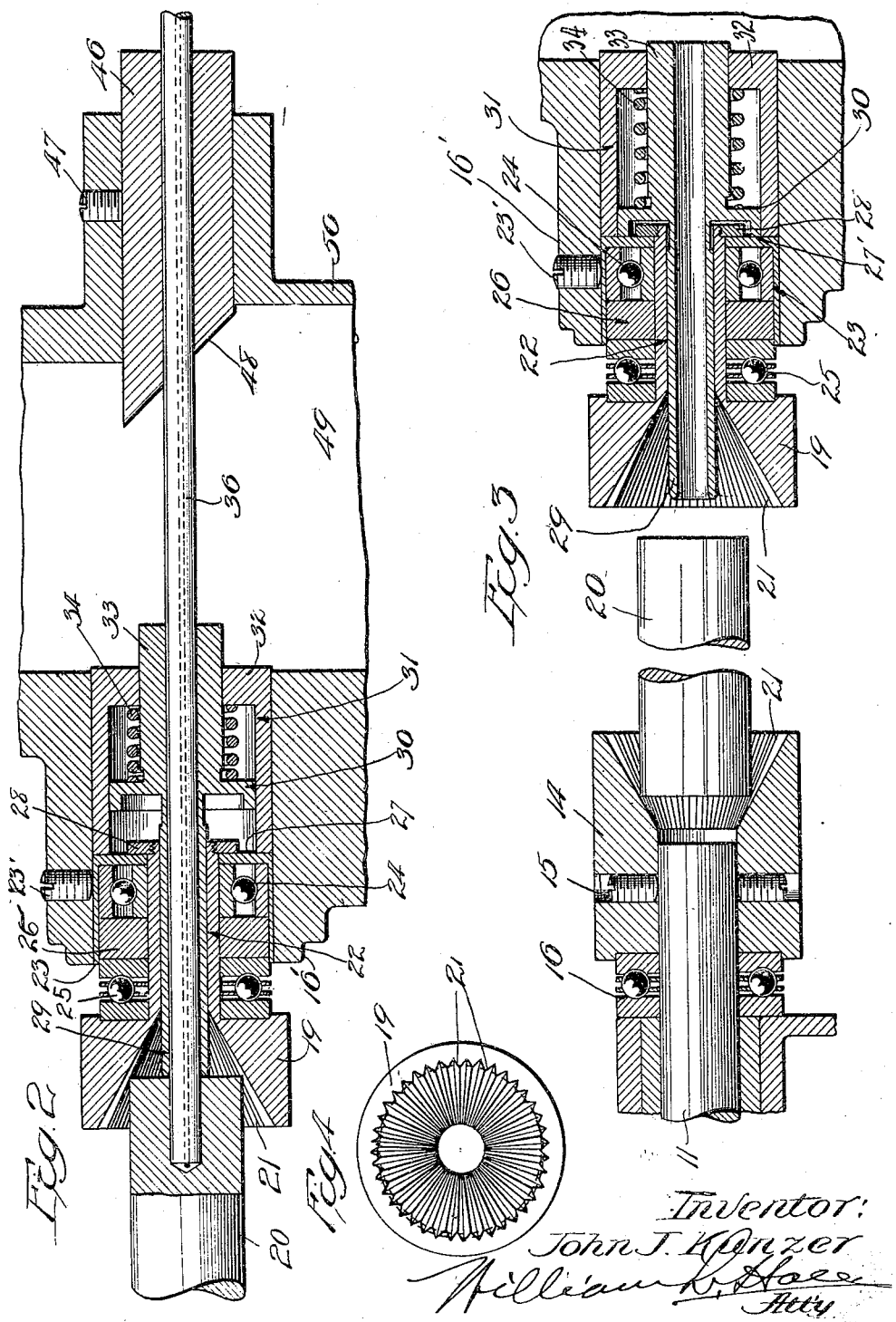

Patented Aug. 5, 1924.

1,503,836

UNITED STATES PATENT OFFICE.

JOHN J. KUNZER, OF CHICAGO, ILLINOIS, ASSIGNOR TO JOSEPH T. RYERSON & SON, OF CHICAGO, ILLINOIS, A CORPORATION OF ILLINOIS.

DEEP-DRILLING MACHINE.

Application filed April 7, 1919. Serial No. 288,169.

*To all whom it may concern:*

Be it known that I, JOHN J. KUNZER, a citizen of the United States, and a resident of Chicago, in the county of Cook and State of Illinois, have invented certain new and useful Improvements in Deep-Drilling Machines; and I do hereby declare that the following is a full, clear, and exact description thereof, reference being had to the accompanying drawings and to the characters of reference marked thereon, which form a part of this specification.

This invention relates to improvements in deep drilling or boring mechanisms, and refers more particularly to novel means for supporting the work while being drilled or bored; to means for guiding the drill to the work; to means for centering the work relatively to the drill, regardless of the fact that the work may not be truly round, and to means whereby cutting fluid and chips may be flushed backwardly away from the work without danger of breaking the drill.

My improvements have been more especially designed for drilling stay bolt blanks which are made of relatively soft material, and in these respects the improvements are adapted to center out of round work, in permissible rolled bar limits, relatively to the axis of the chucking means to avoid breaking the drill, and also to seal the opening in the drill at the entering end thereof so as to direct the cutting fluid and chips backwardly from the work and to prevent clogging of the chips between the drill and the work breaking the drill.

I have herein shown my improvements as applied to a simple form of machine, illustrating only such elementary parts of the machine as are necessary to explain the adaptation of my improvements thereto.

As shown in the drawings,

Figure 1 is a side elevation of a known type of machine to which my improvements are applied.

Figure 2 is an enlarged axial sectional view of one of the chuck elements, showing parts of the machine with which it is associated.

Figure 3 is an enlarged axial section of the opposing chuck elements, with the drill guide chuck element in its non-chucking position.

Figure 4 is a face view of the chucks.

In the machine shown, the work is rotated, by contact with a live or driving chuck, and clamped between it and an idle chuck. The drill, which is non-rotative, is fed axially to the work and extends axially through and is guided in the idle chuck, or that which turns by reason of its contact with the rotating work; and means are provided at the idle chuck for forming a seal around the drill hole at the end of the work to prevent escape of the cutting fluid and chips at the point where the drill enters the work and to direct said cutting fluid and chips backwardly past the work.

As shown in the drawings, 10 designates the bed of the machine. 11 designates a rotative shaft or live spindle that is rotatively supported in upstanding brackets or supports 12 and is provided with a driving pulley or pulleys 13. To the end of the live spindle is fixed a chuck head 14 herein termed the live or driving chuck, it being herein shown as fitted over the live spindle 11 and secured thereto by set screws 15. A thrust bearing 16 is interposed between the bracket 12 and the chuck head 14.

16' designates a slide that is mounted on ways 17 formed on the bed 10. It is slidable towards and from the bracket 12 and may be clamped thereto by means of a clamping screw 18. The said slide 16' carries a chuck head 19, between which and the head 14 the work 20, comprising in the present instance a stay bolt blank, is chucked. The latter chuck is herein termed the idle or clamping chuck. The chuck heads 14 and 19 are formed on their proximate sides with self centering, conical tapered, fluted chuck recesses, the fluted formation of said faces being radial teeth 21 of suitable cross section. Said chuck 19 is formed integral with a sleeve or tube 22 rotatively mounted in a bearing cup 23 that is fixed in any suitable manner, as by a set screw 23' in the slide 16'. A radial anti-friction bearing 24 lies between the sleeve 22 and said cup 23, and a thrust bearing 25 is interposed between the chuck 19 and a separator ring 26 that bears against the cages of the anti-friction bearing 24. The said sleeve 22 extends through an opening in the outer end wall 27' of the cup 23 and is threaded at its outer end to receive a lock nut 28 which holds the sleeve and chuck 19 assembled in the bearing cup 23.

29 designates a drill guide and sealing tube which is disposed axially of the chuck 19 and fits closely within the chuck sleeve 22. Said tube 29 is made longer than the sleeve and projects at its inner end into the fluted recess of the chuck 19. Formed integral with or attached fixedly to the said tube 29 is a plunger 30 which reciprocates in a cylinder 31 that is seated in the slide 16' in rear of the bearing cup 23. Said cylinder 31 is partially closed at its outer end by an end wall 32 which is centrally apertured to receive a tubular guide extension 33 that is formed integral with or fixedly attached to the tube 29 and plunger 30. The bore of said guide extension is in axial alignment with the guide and sealing tube 29. Interposed between the plunger 30 and the end wall 32 of the cylinder 31 is a spiral expansion spring 34 which tends, when unrestrained, to thrust the drill guide and sealing tube 29 inwardly in the position shown in Figure 3, the contact of the plunger 30 with the outer wall 27' of the chuck bearing cup limiting the inward movement of said tube 29.

36 designates a boring bar or drill by which the central openings in the bolt blanks are drilled, said drill extending through and guided in the hollow plunger extension 33 and the guide and sealing tube 29, as shown in Figures 2 and 3. The drill 36 is supported at its outer end in a socket 37 that is formed on and extends forwardly from a feed slide 38 supported on the frame 10. Said feed slide is designed to be moved towards the slide 16' by a feed screw 39 which operates in a split nut 40 mounted in the base of the slide 38 and normally locked to said feed screw by a clamp screw 41. When the said clamp screw is released the feed bracket may be moved toward and away from the slide 16 by means of a rack and pinion mechanism operated by a hand wheel 42 of any preferred type. The said feed screw may be automatically operated from a power shaft 43 through the worm gear drive indicated in Figure 1.

So far as the details of the machine frame, the slides, and the drive and feed mechanisms are concerned, it will be understood that these parts are shown only in a general way in Figure 1 merely for the purpose of illustrating an adaptation of my invention to a suitable drive and feed mechanism.

The drill 36 is formed with an axial channel or duct to permit a cutting fluid under pressure to be fed to the cutting end of the drill, as indicated in dotted lines in Figure 2; and a cutting fluid may be delivered to the drill duct through a pipe 44 that is connected to a chamber 45 in the slide 38, which chamber is connected to the outer end of said duct. Oil under high pressure is delivered to the drill duct when the drill is in operation, as is common in this class of drilling.

The drill 36 is supported intermediate its ends by a guide bushing 46 which is supported in the slide 16', and fixed thereto, as by a set screw 47, as shown in Figure 2. Said guide bushing is cut obliquely across its inner end to provide a deflecting surface 48 to deflect the chips carried backwardly through the flush grooves of the drill. Said chips and the cutting fluid drop away from the drill into a chamber 49 below, formed in a casting 50 associated with the slide 16. Said receptacle is provided at its upper side with an opening that is closed by a door 51, through which opening the backward delivery of the chips and cutting fluid may be observed.

In operation the chuck 14 constitutes the live or driving chuck and the chuck 19 constitutes the clamping or idle chuck. The work is fixed in the machine by releasing the slide 16', placing the work between the chucks and forcing the slide towards the driving chuck 14 to thereby engage the chucks and the ends of the work. When the work enters the chuck 19 it engages the end of the guide and sealing tube 29, that is normally projected into the recess of the chuck, as shown in Figure 3, and as the work enters and finds its seat in the conical chuck recess, the said guide and sealing tube is forced against the action of the spring 34 to the position shown in Figure 2. Inasmuch as the work is relatively softer than the chuck and inasmuch as the work is engaged by the toothed cone face of the chuck at the thin edges between the end faces and the cylindric face of the work, the said teeth will bite or be forced into the work, so as to afford a driving connection between the driving chuck 14 and the adjacent end of the work and also between the other end of the work and the chuck 19. The work is, therefore, caused to rotate about its axis, and the drill, which is non-rotative, is fed towards the work.

The guide and sealing tube is made of a material harder than that of the work and the strength of the spring 34 is such as to maintain a substantial pressure between the tube and the end of the work. The wall of the tube at its free end, where it contacts with the work, is tapered or otherwise reduced in area so that the friction between the tube end and the work is not sufficient to turn the tube, the pressure of the spring and its frictional contact with the plunger and cylinder wall overcoming the tendency of the tube to rotate. The guide and sealing tube may be otherwise made non-rotative relatively to the work.

The effect of rotating the work against the inner end of the stationary sealing and guide tube causes the latter to form a sealing seat on the end of the work around the opening produced by the drill, so as to avoid the escape of the cutting fluid and chips at their point of emergence from the work. The cutting fluid and chips are, therefore, carried backwardly past the sealed joint through the sealing and guide tube and are discharged into the chamber 49, the chips being scraped off the drill bar at the beveled end of the guide tube 46. If the cutting fluid and chips were allowed to escape at the end of the opening in the work adjacent to the idle chuck 19 they would tend to clog the drill at the margin of said opening, with the result of breaking the drill. With the construction described it will be seen that there is provided a means for automatically sealing the opening in the bolt blank at the point where the drill first enters the same and that this seal is self formed by the drill guiding tube; the tube, under the action of the spring 34 thus performing the double function of a guide and sealing element. When the bolt has been drilled throughout its length, or to any other depth desired, the drill is retracted either by hand or automatic power and the chuck slide 16 released from its way so as to release the drilled bolt blank and another blank chucked in the machine.

The provision of the conically recessed chucks, having radial teeth of substantial depth at their ends, has the effect, in addition to affording the driving connections described, to center the work regardless of whether the blanks be slightly eccentric at their ends such as may occur in permissibly out of round bar stock. This is due to the fact that the chucks are made of metal considerably harder than the metal of the bolt blanks, and by reason of the axial relation of the chucks and of the concentric relation of the toothed cone faces of the chuck recesses relatively to the axes of the chucks and of the fact that the teeth 22 are of some depth and are sharp, the said teeth will bite into the corners of the blank ends sufficiently to center blanks whose ends are not truly round. It has been demonstrated that blanks whose ends are appreciably eccentric may be drilled when so centered in chucks without breaking the drill, which indicates true centering of the blanks. This self centering feature of the device is of great advantage inasmuch as it avoids the necessity and consequent cost of cylindrically surfacing the blanks to accurately fit chucks that embrace the cylindrically surfaced parts of the work, as has heretofore been a common practice in deep drilling work.

I claim as my invention:

1. In drilling machines, chuck means for holding the work for presentation thereto of a drill, and means having end engagement with the face of the work to automatically frictionally form a metallic seal in the end face of the work around the drilled area.

2. In drilling machines, chuck means for holding the work for presentation thereto of a drill, with means for rotating one of said chucks and the work, the other chuck being freely rotatable, and means non-rotative within the latter chuck and surrounding the drill for automatically forming a seal on the face of the work around the drilled hole.

3. In drilling machines, chuck means for holding the work for presentation thereto of a drill and for rotating the work, a drill guide, nonrotative relatively to the work extending axially into one of the chucks, and means for pressing it directly against the face of the work around the drilled area of the work to produce in said face a self-forming seal.

4. A drilling machine embracing work-holding chucks, one of which is axially apertured for the passage of a drill, and means within the latter chuck for forming a seal in the face of the work around the drilled opening therein by relative rotation of said means and work to prevent escape of cutting fluid and chips from the work at the point where the drill enters the work.

5. A drilling machine embracing work-holding chucks, one of which is axially apertured for the passage of a drill, a hollow drill guide and sealing tube extending axially into said latter chuck and adapted to directly engage the work around the drilled area thereof and non-rotative relatively to the work, and means to press said guide against the work.

6. A drilling machine embracing work-holding chucks, one of which is axially apertured for the passage of a drill, and a rearwardly yieldable hollow drill guide and sealing tube extending axially into said latter chuck and adapted for direct friction forming contact at its end with the work around the drilled area thereof.

7. A drilling machine embracing work-holding chucks, one of which is centrally apertured for the passage of a drill, a hollow drill guide extending axially into the latter chuck and adapted for direct contact at its end with the work around the drilled area thereof, and means acting on said guide to force the end of the latter against the work to produce a self-formed seal.

8. A drilling machine embracing opposing work-holding chucks, one of which is driven to rotate the work, and the other of which is rotatively mounted in the machine frame, a non-rotative drill guide extending axially into the latter chuck and bearing directly against the work radially exterior to the drill, and means for pressing the drill guide against the work to produce a self-formed seal.

9. A drilling machine comprising a frame, opposed work-holding chucks, one of which is provided with driving means mounted in the frame, whereby to rotate the work, means to rotatively mount the other chuck in said frame to permit it to be driven by the work held between said chucks, a drill guide and sealing tube extending axially into the latter chuck and non-rotative relatively to said chuck, and means for pressing said tube directly against the face of the work radially exterior to the drill to produce a self-formed seal.

10. A drilling machine comprising a frame, opposed work-holding chucks, one of which is provided with a driving shaft that is mounted in the frame, whereby to rotate the work, the other chuck being provided with a sleeve, a bearing in the machine frame in which said sleeve is rotatively mounted, a drill guide and sealing tube extending through said sleeve and axially into the latter chuck and adapted for direct contact with the face of the work around the drilled hole made therein, and means for pressing said tube against the work to produce a self-formed seal.

11. A drilling machine comprising a frame, opposed work-holding chucks, one of which is provided with a driving shaft that is mounted in the frame, the other chuck being provided with a sleeve, a bearing in the machine frame in which said sleeve is rotatively mounted, a drill guide and sealing tube extending through said sleeve and axially into the latter chuck and adapted for contact with the work around the drilled hole therein, a cylinder in the frame in rear of said bearing, a plunger rigid with said tube sliding in said cylinder, and pressure means interposed between said plunger and the cylinder wall.

12. A drilling machine comprising a frame, opposed work-holding chucks, one of which is driven, the other chuck being provided with a sleeve, a bearing in the machine frame in which said sleeve is rotatively mounted, a drill guide and sealing tube extending through said sleeve and axially into the latter chuck and adapted for contact with the work around the drilled hole therein, a cylinder in the frame in rear of said bearing, a plunger rigid with said tube and provided with an integral drill guide extension, and a spiral spring surrounding said extension and interposed between said plunger and cylinder wall.

13. A drilling machine comprising a frame, work-holding chucks mounted in the frame, means to drive one of said chucks and the work engaged thereby, the other chuck being provided with a supporting sleeve, a non-rotative bearing cup in the frame in which said sleeve is rotatively mounted, with anti-friction bearings between the sleeve and cup, said sleeve extending beyond the cup and threaded to receive a lock nut which bears against said cup, a drill guide and a sealing tube extending through said sleeve and axially into said latter chuck and having contact with the work around the drilled hole therein, and spring means acting against said tube to press it against the work.

14. A drilling machine comprising a frame, work-holding chucks mounted therein, with means to drive one of them and the work, the other chuck being mounted in the frame to rotate freely, a receptacle in rear of the latter chuck to receive cutting fluid and chips, and a non-rotative drill guide and sealing tube disposed axially of and extending into the latter chuck for contact with the work around the drilled area thereof, said drill guide extending backwardly to and opening into said receptacle.

15. A drilling machine embracing opposing work-holding chucks, with means to drive one of said chucks and the work, said chucks being formed with self-centering recesses to engage the edges of cylindric work between the end faces and the cylindric face thereof, and a non-rotative drill guide and sealing tube extending axially into one of said chucks, with means to press its end against the work around the drilled hole therein.

16. A drilling machine embracing opposing rotary work-holding chucks having self centering recesses and formed on the walls of said recesses with internal driving formations to engage the ends of the work, a drill guide and sealing tube axially in the centering recess of one of said chucks, with means to press it against the end face of the work around the drill hole therein, and means to impart relative rotary motion to said work and said tube.

In testimony whereof I claim the foregoing as my invention, I hereunto append my signature at Chicago, Illinois, this 3rd day of April, 1919.

JOHN J. KUNZER.